United States Patent
Hsieh

(10) Patent No.: US 10,776,265 B2
(45) Date of Patent: Sep. 15, 2020

(54) DATA STORAGE DEVICES AND DATA PROCESSING METHODS

(71) Applicant: Silicon Motion, Inc., Jhubei, Hsinchu County (TW)

(72) Inventor: Sung-Yen Hsieh, New Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 34 days.

(21) Appl. No.: 16/387,864

(22) Filed: Apr. 18, 2019

(65) Prior Publication Data
US 2019/0347198 A1 Nov. 14, 2019

(30) Foreign Application Priority Data
May 14, 2018 (TW) ............... 107116287 A

(51) Int. Cl.
*G06F 12/00* (2006.01)
*G06F 12/02* (2006.01)
*G06F 11/14* (2006.01)
*G06F 12/0882* (2016.01)

(52) U.S. Cl.
CPC ...... *G06F 12/0253* (2013.01); *G06F 11/1438* (2013.01); *G06F 12/0246* (2013.01); *G06F 12/0882* (2013.01)

(58) Field of Classification Search
CPC ............. G06F 12/0253; G06F 11/1438; G06F 12/0246; G06F 12/0882
See application file for complete search history.

(56) References Cited

U.S. PATENT DOCUMENTS

| | | |
|---|---|---|
| 8,874,830 B2 | 10/2014 | Cheng |
| 2015/0179274 A1 | 6/2015 | Kim et al. |
| 2018/0052638 A1 | 2/2018 | You |
| 2018/0107412 A1 | 4/2018 | Jun |

FOREIGN PATENT DOCUMENTS

| | | |
|---|---|---|
| TW | 201324144 A | 6/2013 |
| TW | 201807568 A | 3/2018 |

*Primary Examiner* — Gurtej Bansal
(74) *Attorney, Agent, or Firm* — Winston Hsu

(57) ABSTRACT

A data storage device includes a memory controller and a memory device. The memory controller includes multiple memory blocks each including a first predetermined number of pages. In an SPOR procedure, the memory controller is configured to divide a destination memory block previously utilized in a garbage collection procedure that has not been finished into multiple sub-blocks each including a second predetermined number of pages, sequentially perform a binary search on one or more sub-blocks to determine a first empty page of the destination memory block, sequentially read one or more pages from the first empty page to determine a last valid page of the destination memory block, and re-perform the garbage collection procedure according to the last valid page. The second predetermined number is smaller than the first predetermined number and is a power of 2.

15 Claims, 10 Drawing Sheets

DATA STORAGE DEVICES AND DATA PROCESSING METHODS

CROSS REFERENCE TO RELATED APPLICATIONS

This application claims priority of Taiwan Patent Application No. 107116287, filed on May 14, 2018, the entirety of which is incorporated by reference herein.

BACKGROUND OF THE INVENTION

Field of the Invention

The invention relates to a data storage device and a data processing method, which is capable of rapidly and accurately searching for the last valid data page of a memory block.

Description of the Related Art

With the rapid growth of data storage technology in recent years, many data storage devices—such as memory cards manufactured in compliance with the SD/MMC standards, CF standards, MS standards or XD standards, as well as solid state hard drives, Embedded Multi Media Cards (eMMC) and Universal Flash Storage (UFS)—have been used widely for a variety of purposes. Therefore, effective control of access to these data storage devices is an important issue.

Generally, if a sudden power-off (SPO) occurs during the programming of a flash memory device, the data being written into the memory device at the time of the power-off, or data that has already been written into the memory device, may be damaged. For example, when a flash memory device undergoes a sudden power-off while performing Garbage Collection (GC), the data which was currently being written into the destination memory block may be damaged. Therefore, when the flash memory device powers on, a Sudden Power Off Recovery (SPOR) procedure will usually be performed, so as to search for the last valid data page and resume the GC procedure which has been suspended by the SPO.

However, as the storage capacity of the flash memory increases, the time required to search for a valid data page also grows.

In view of this, a data processing method which is capable of rapidly and accurately searching for the last valid data page of a memory block is proposed.

BRIEF SUMMARY OF THE INVENTION

Data storage devices and data processing methods are provided. An exemplary embodiment of a data storage device comprises a memory device and a memory controller. The memory controller comprises a plurality of memory blocks, and each memory block comprises a first predetermined number of pages. The memory controller is coupled to the memory device and configured to access the memory device. In a sudden power off recovery (SPOR) procedure, the memory controller is configured to divide a destination memory block previously utilized in a garbage collection procedure that has not been finished into multiple sub-blocks, sequentially perform a binary search on one or more sub-blocks to determine a first empty page of the destination memory block, sequentially read one or more pages from the first empty page to determine a last valid page of the destination memory block and re-perform the garbage collection procedure according to the last valid page. Each sub-block comprises a second predetermined number of pages, the second predetermined number is smaller than the first predetermined number, and the second predetermined number is a power of 2.

An exemplary embodiment of a data processing method for a data storage device comprising a memory device and a memory controller, wherein the memory device comprises a plurality of memory blocks, each memory block comprises a first predetermined number of pages, and the memory controller is coupled to the memory device and configured to access the memory device. The method comprises: dividing a destination memory block previously utilized in a garbage collection procedure that has not been finished into multiple sub-blocks in a sudden power off recovery (SPOR) procedure of the memory device, wherein each sub-block comprises a second predetermined number of pages, the second predetermined number is smaller than the first predetermined number, and the second predetermined number is a power of 2; sequentially performing a binary search on one or more sub-blocks to determine a first empty page of the destination memory block; sequentially reading one or more pages from the first empty page to determine a last valid page of the destination memory block; and re-performing the garbage collection procedure according to the last valid page.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to make the objects, features and advantages of the invention more comprehensible, specific embodiments of the invention are set forth in the accompanying drawings.

This description is made for the purpose of illustrating the general principles of the invention and should not be taken in a limiting sense. It should be understood that the following embodiments can be implemented by software, hardware, firmware, or any combination thereof. The scope of the invention is determined by reference to the appended claims.

Figure 1:
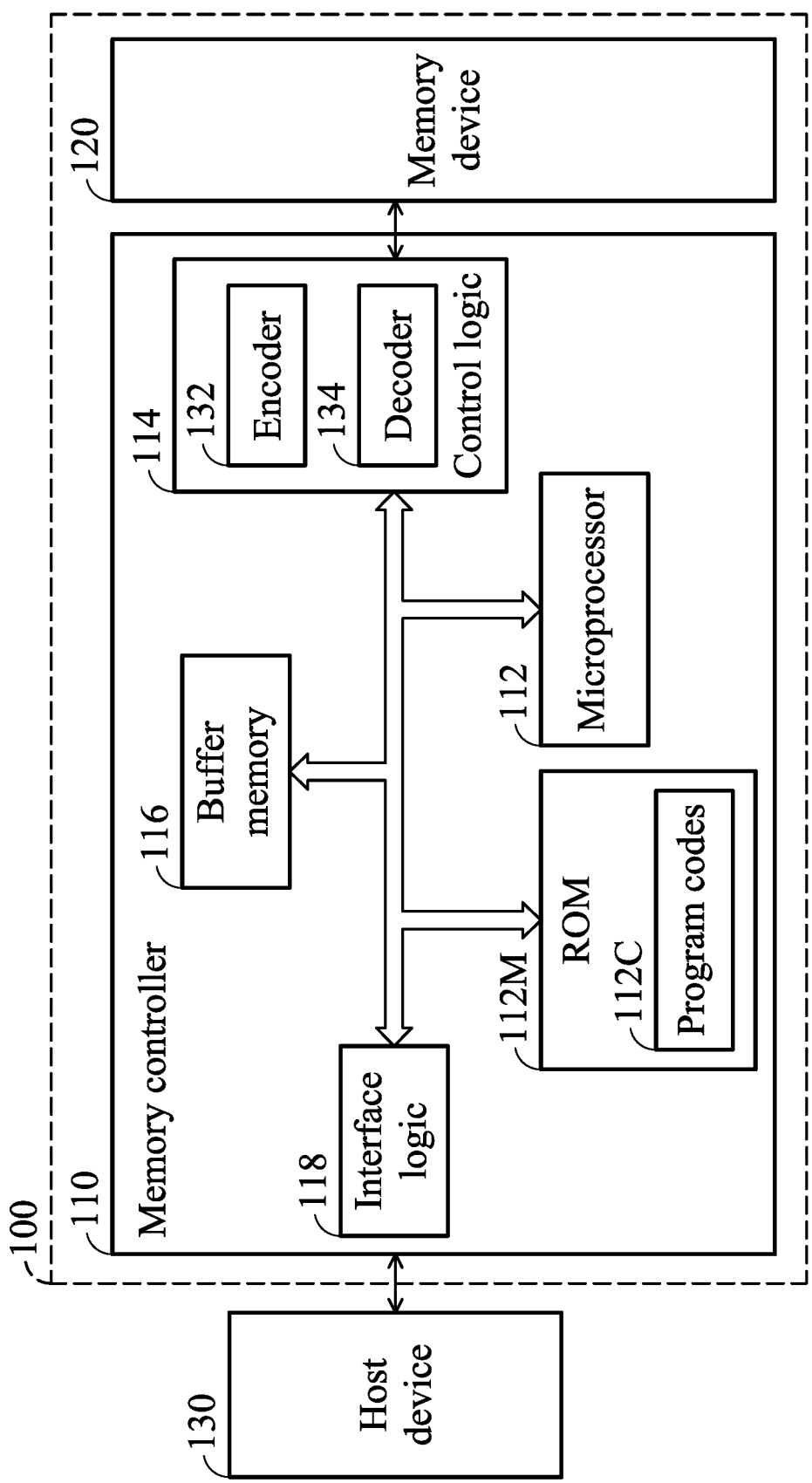
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120, such as a flash memory module, and a memory controller 110. The memory controller 110 is configured to access the memory device 120. According to an embodiment of the invention, the memory controller 110 may comprise a microprocessor 112, a Read Only Memory (ROM) 112M, a control logic 114, a buffer memory 116 and an interface logic 118. The ROM 112M is configured to store program codes 112C. The microprocessor 112 is configured to execute the program codes 112C, thereby controlling access to the memory device 120. The control logic 114 may comprise an encoder 132 and a decoder 134. The encoder 132 is configured to encode the data to be written into the memory device 120 so as to generate corresponding correcting/checking code (also called error correction code (ECC)). The decoder 134 is configured decode the data read out from the memory device 120.

Typically, the memory device 120 may comprise a plurality of flash memory chips, and each flash memory chip may comprise a plurality of memory blocks. The access unit of an erase operation performed by the controller (e.g., the memory controller 110, through the execution of the program codes 112C by the microprocessor 112) on the memory device 120 may be one memory block. In addition, a memory block may record (comprise) a predetermined number of pages, and the access unit of a write operation performed by the controller (e.g., the memory controller 110, through the execution of the program codes 112C by the microprocessor 112) on the memory device 120 may be one page.

In practice, the memory controller 110 may perform various control operations by using its own internal components through the execution of the program codes 112C by the microprocessor 112. For example, the memory controller 110 may use the control logic 114 to control the access operations (especially the access operation for at least a memory block or at least a page) of the memory device 120, use the buffer memory 116 to perform necessary data buffer operations, and use the interface logic 118 to communicate with a host device 130. The buffer memory 116 may be implemented by a Random Access Memory (RAM). For example, the buffer memory 116 may be an SRAM, but the invention should not be limited thereto.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the Universal Flash Storage (UFS) or the Embedded Multi Media Card (EMMC) standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

According to an embodiment of the invention, the memory blocks comprised in the memory device 120 may be configured as the Single-Level Cell (SLC) memory blocks, the Multiple-Level Cell (MLC) memory blocks and/or the Triple-Level Cell (TLC) memory blocks. The memory cell of the SLC memory block is configured to store one bit data, the memory cell of the MLC memory block is configured to store two bits data, and the memory cell of the TLC memory block is configured to store three bits data.

According to an embodiment of the invention, each memory block may comprise a first predetermined number of pages, where the page may be a logical page. Therefore, for the SLC memory block, the MLC memory block and the TLC memory block, value of the first predetermined number may be different. For example, the number of logical pages comprised in a TLC memory block may be triple of that comprised in an SLC memory block.

Generally, transfer of the data stored the memory device 120 is required in some predetermined procedure. For example, data transfer is required in a garbage collection procedure of the memory blocks. When performing the garbage collection procedure, the data stored in a source memory block will be moved (written) to a destination memory block. In the process of data transfer, the most undesirable event is the occurrence of a Sudden Power Off (SPO).

When the memory device 120 undergoes the SPO during the process of data transfer, in the conventional design, the memory controller will give up the data that has been completely transferred. That is, the data that has been moved to the destination memory block will be discarded, and the memory controller 110 will search for another empty memory block and re-start the data transfer. For example, when the data storage device powers up, the microprocessor 112 may read the value of some variables (for example, an SPO flag or an SPO count), so as to determine whether the SPO has occurred. The SPO count is a value for accumulating the times that the SPO has occurred. When the SPO count is increased, the memory controller 110 can determine that the previous power off of the data storage device is caused by an SPO. In addition, the SPO flag is a flag to indicate whether the previous power off of the data storage device is caused by an SPO or not. For example, when the value of the SPO flag is set to 1, it means that an SPO has occurred (the previous power off of the data storage device is caused by an SPO). When the value of the SPO flag is set to 0, it means that the previous power off of the data storage device is a result of a normal power-off procedure. Every time when the data storage device 100 powers up, the microprocessor 112 may set the value of the SPO flag to 1 and store this value in the memory device 120. When a normal power-off procedure is triggered, the microprocessor 112 may set the value of the SPO flag to 0 and store this value in the memory device 120. Therefore, when the data storage device 100 powers up after an SPO, the value of the SPO flag will be held at 1 and the microprocessor 112 can determine that an SPO has occurred. In the conventional design, when the memory controller 110 detects that an SPO has occurred and some data transfer is left unfinished, the memory controller 110 will directly discard the unfinished data transfer procedure, select another empty memory block and re-start the data transfer procedure from the beginning of the data transfer procedure.

Different from the conventional design, in the embodiment of the invention, when the data storage device 100 powers on, the microprocessor 112/the memory controller 110 (for simplicity, hereinafter the memory controller 110 will be utilized as a representative) may determine whether an SPO has occurred. When the memory controller 110 determines that an SPO has occurred during the process of performing a garbage collection procedure, the memory controller 110 will perform a corresponding Sudden Power Off Recovery (SPOR) procedure, so as to find the proper page from which to continue the unfinished garbage collection procedure.

Figure 2:
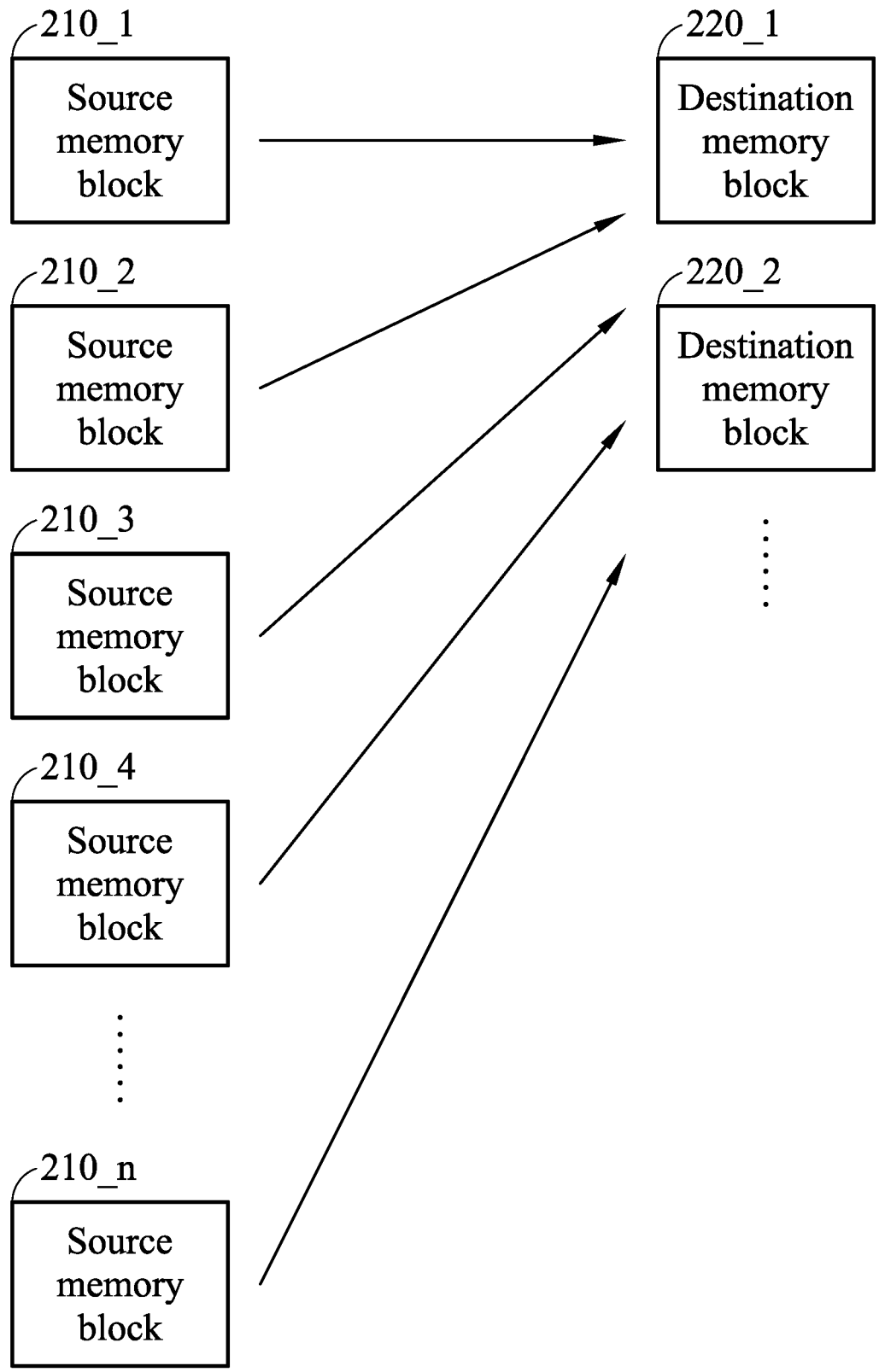
FIG. 2 is a schematic diagram showing the operations of moving valid data from multiple source memory blocks to multiple destination memory blocks in the garbage collection procedure.

FIG. 2 is a schematic diagram showing the operations of moving valid data from multiple source memory blocks to multiple destination memory blocks in the garbage collection procedure. Suppose that the memory device 120 comprises a plurality of source memory blocks 210_1~210_n and a plurality of destination memory blocks 220_1 and 220_2, where the source memory blocks 210_1~210_n may be the SLC memory blocks and the destination memory blocks 220_1 and 220_2 may be the MLC memory blocks or the TLC memory blocks. In the operations of the data storage device 100, when the memory controller 110 receives write commands from the host device 130, the memory controller 110 writes the data to the source memory blocks 210_1~210_n sequentially in response to the received write commands. Some portion of the data written in the source memory blocks will become invalid due to some subsequent data update. Therefore, when the number of memory blocks that are writable among the source memory blocks 210_1~210_n is lower than a specific value, the memory controller 110 may trigger a procedure to move the valid data in the source memory blocks to the destination memory blocks 220_1 and 220_2, so as to release the source memory blocks for future use. Such an operation is called a garbage collection. It should be noted that the condition to trigger a garbage collection procedure is not limited to the condition of there being an insufficient number of writable memory blocks in the source memory blocks 210_1~210_n. For example, the condition to trigger a garbage collection procedure may also be when the memory controller 110 determines that the quality of data stored in some of the source memory blocks 210_1~210_n is poor. In addition, since those who are skilled in this technology should understand the operations of the garbage collection procedure, details of a garbage collection procedure are omitted here for brevity.

Figure 3:
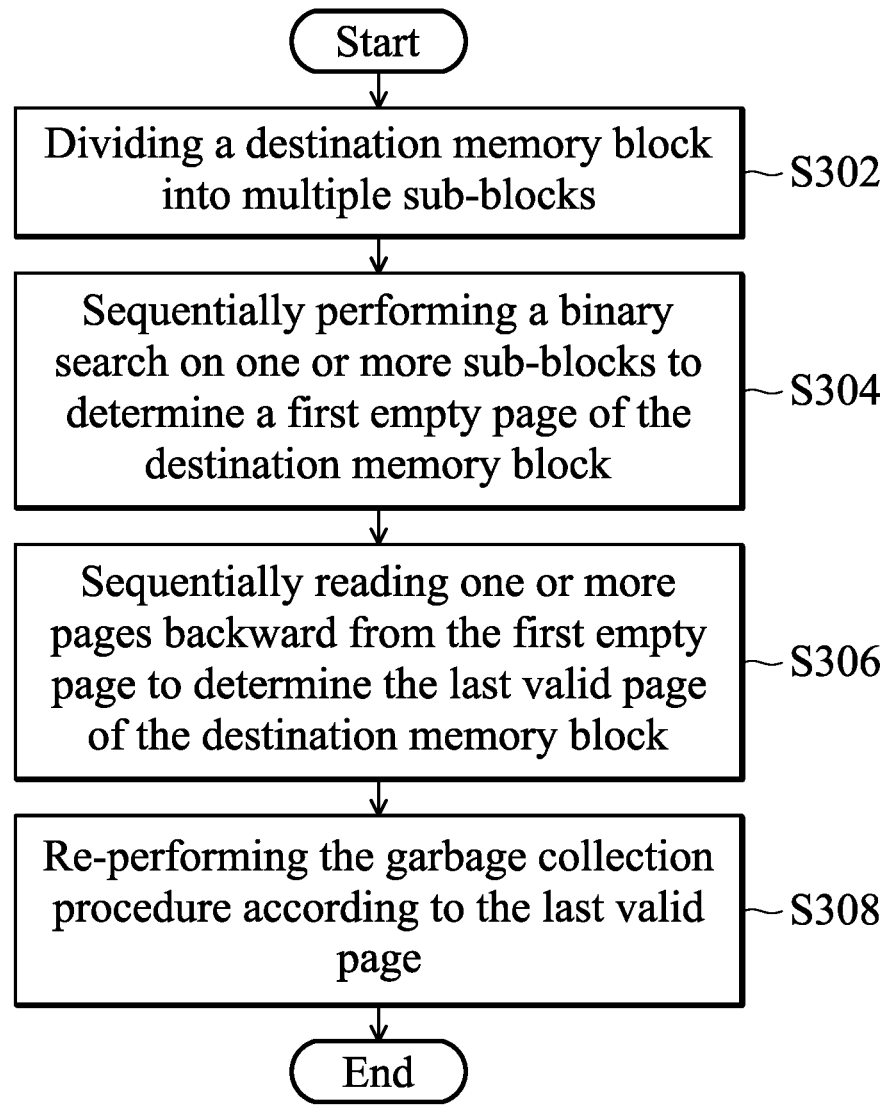
FIG. 3 is a flow chart of a data processing method according to an embodiment of the invention.

FIG. 3 is a flow chart of a data processing method according to an embodiment of the invention.

In step S302: in a sudden power off recovery (SPOR) procedure of the memory device 120, the memory controller 110 is configured to divide a destination memory block previously utilized in a garbage collection procedure that has not been finished into multiple sub-blocks, such that a sub-block comprises a second predetermined number of pages. As discussed above, each memory block may comprise a first predetermined number of pages, and after the division step, a sub-block may comprise a second predetermined number of pages. Therefore, the second predetermined number is smaller than the first predetermined number, and the second predetermined number is a power of 2 (that is, the second predetermined number equals $2^y$ (a power of 2), where y is a positive integer).

According to an embodiment of the invention, it is preferable to divide the destination memory block equally into multiple sub-blocks. In this manner, after the division step, each sub-block may comprise the second predetermined number of pages. However, it should be noted that the division in step S302 is not limited to equally divide the destination memory block into multiple sub-blocks. That is, the division in step S302 may also comprise unequally dividing the destination memory block into multiple sub-blocks. The scope of the invention also covers unequally dividing the destination memory block into multiple sub-blocks, as long as the numbers of pages comprised in the divided sub-blocks can all be a power of 2.

In step S304: the memory controller 110 is configured to sequentially performing a binary search on one or more sub-blocks to determine the first empty page of the destination memory block. In step S304, if the first empty page exists in a first sub-block which is selected first to perform the binary search, the memory controller 110 only has to perform the binary search on one sub-block. If the first empty page does not exist in the first sub-block which is selected first to perform the binary search, the memory controller 110 has to perform the binary search on more than one sub-block.

In step S306: the memory controller 110 is configured to sequentially read one or more pages backward from the first empty page determined in the step S304 to determine the last valid page of the destination memory block.

In step S308: the memory controller 110 is configured to re-perform the garbage collection procedure according to the last valid page.

According to an embodiment of the invention, in step S304, the memory controller is configured to determine whether the page being searched is an empty page according to the content recorded in a spare region of the page. For example, the memory controller 110 may determine whether the page being searched is an empty page by checking whether the spare region of this page stores metadata. If the content recorded in the spare region is a default value, such as 0XFFFF (that is, all bits are set to 1), the memory controller 110 may determine that this page is an empty page.

According to an embodiment of the invention, the memory controller is configured to sequentially assign an index to each sub-block, and the indices assigned to the sub-blocks form an incremental sequence. In addition, the pages comprised in each memory block may also be assigned with an index (which is a global index). In an embodiment of the invention, the larger the indices of the pages comprised in a sub-block are (as compared to the indices of the pages comprised in another sub-block), the larger the index of the corresponding sub-block is (as compared to the index the other sub-block). In addition, according to an embodiment of the invention, in step S304, the memory controller may perform the binary search from the sub-block having the smallest index. According to another embodiment of the invention, in step S304, the memory controller 10 may perform the binary search from the sub-block having an index that is closest to the median of the incremental sequence. It should be noted that in still some other embodiment of the invention, the memory controller 10 may also perform the binary search from the sub-block having a largest index. Details of the steps illustrated in FIG. 3 will further be illustrated in the following paragraphs.

According to an embodiment of the invention, when the first empty page is determined (found), in step S306, the memory controller 110 is configured to sequentially read one or more pages from the first empty page determined in the step S304, so as to determine the last valid page of the destination memory block (for example, the destination memory block 220_1), and is configured to re-perform the garbage collection procedure according to the last valid page.

Figure 4:
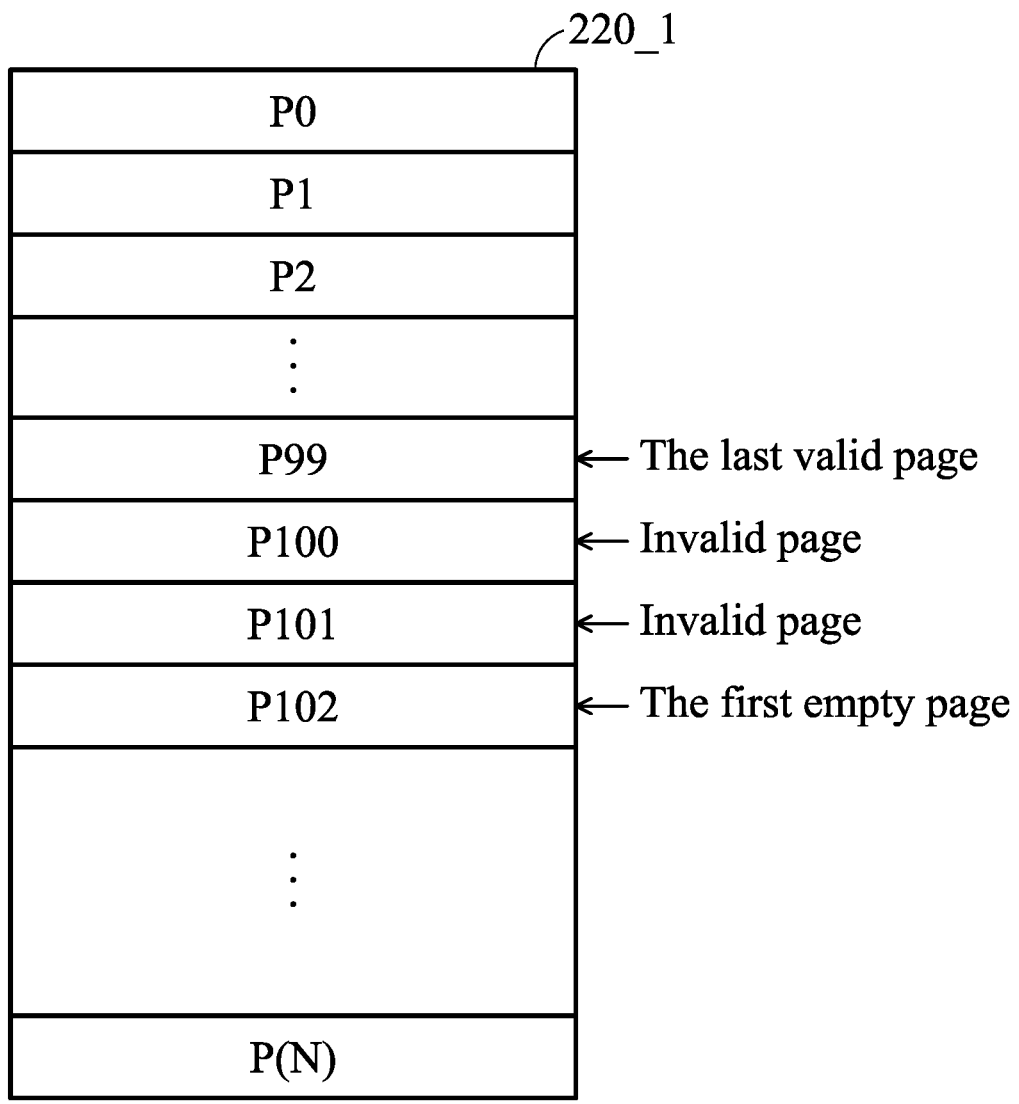
FIG. 4 is a schematic diagram showing the operation of reading one or more pages backward from the first empty page of the destination memory block to find the last valid page of the destination memory block according to an embodiment of the invention.

FIG. 4 is a schematic diagram showing the operation of reading one or more pages backward from the first empty page of the destination memory block to find the last valid page of the destination memory block according to an embodiment of the invention. Suppose that the first empty page of the destination memory block 220_1 determined by the memory controller 110 is page P102, according to an embodiment of the invention, the memory controller 110 may first read the data stored in page P101 and determine whether the quality of the data satisfies a criterion. If the data quality of page P101 satisfies the criterion, the memory controller 110 may determine that page P101 is a valid page. If the data quality of page P101 does not satisfy the criterion, the memory controller 110 may determine that page P101 is an invalid page. For example, the decoder 134 may decode (including performing the error correction) the data stored in page P101 to determine whether the data stored in page P101 can be successfully read (that is, whether the decode operation can be completed correctly). If the data stored in page P101 can be read successfully, the memory controller 110 may determine that page P101 is a valid page. If the data stored in page P101 cannot be read successfully, the memory controller 110 may determine that page P101 is an invalid page. In another example, the criterion may also be that the number or a ratio of error bits comprised in page P101 is lower than a threshold value.

In this embodiment, page P101 is an invalid page. Therefore, the memory controller 110 may keep reading the pages backward, that is, the memory controller 110 may read the data stored in page P100 and determine whether the data quality thereof satisfies the criterion. In this embodiment, page P100 is also an invalid page. Therefore, the memory controller 110 is configured to keep reading the pages backward, until a page having the data quality that satisfies the criterion is met. In this embodiment, since page P99 is the page that the memory controller 110 first finds to have the quality satisfying the criterion, page P99 is determined as the last valid page of the destination memory block 220_1. When the last valid page of the destination memory block 220_1 is found, the memory controller 110 can stop reading the page backward.

According to an embodiment of the invention, when the last valid page is determined, in step S308, the memory controller 110 may resume the garbage collection procedure that has not been finished according to a source memory block and the page information recorded in the last valid page.

In the embodiment shown in FIG. 4, after determining that the last valid page of the destination memory block 220_1 is page P99, the memory controller 110 may read the spare region of page P99, so as to obtain information regarding a page of the source memory block corresponding to page P99, and resume the garbage collection procedure that has not been finished. According to an embodiment of the invention, suppose that the spare region of page P99 records the information that the data of page P99 is copied from the $13^{th}$ page of the source memory block 210_3, the memory controller 110 may resume the garbage collection procedure from the $14^{th}$ page of the source memory block 210_3, so as to sequentially copy the following valid data of the source memory block 210_3 to the remaining pages P102~P(N) of the destination memory block 220_1.

According to another embodiment of the invention, the memory controller 110 may also write dummy data to the remaining pages P102~P(N) of the destination memory block 220_1, so as to stabilize the destination memory block 220_1, and resume the garbage collection procedure from the $14^{th}$ page of the source memory block 210_3, to sequentially copy the following valid data of the source memory block 210_3 to another destination memory block 220_2.

Figure 5:
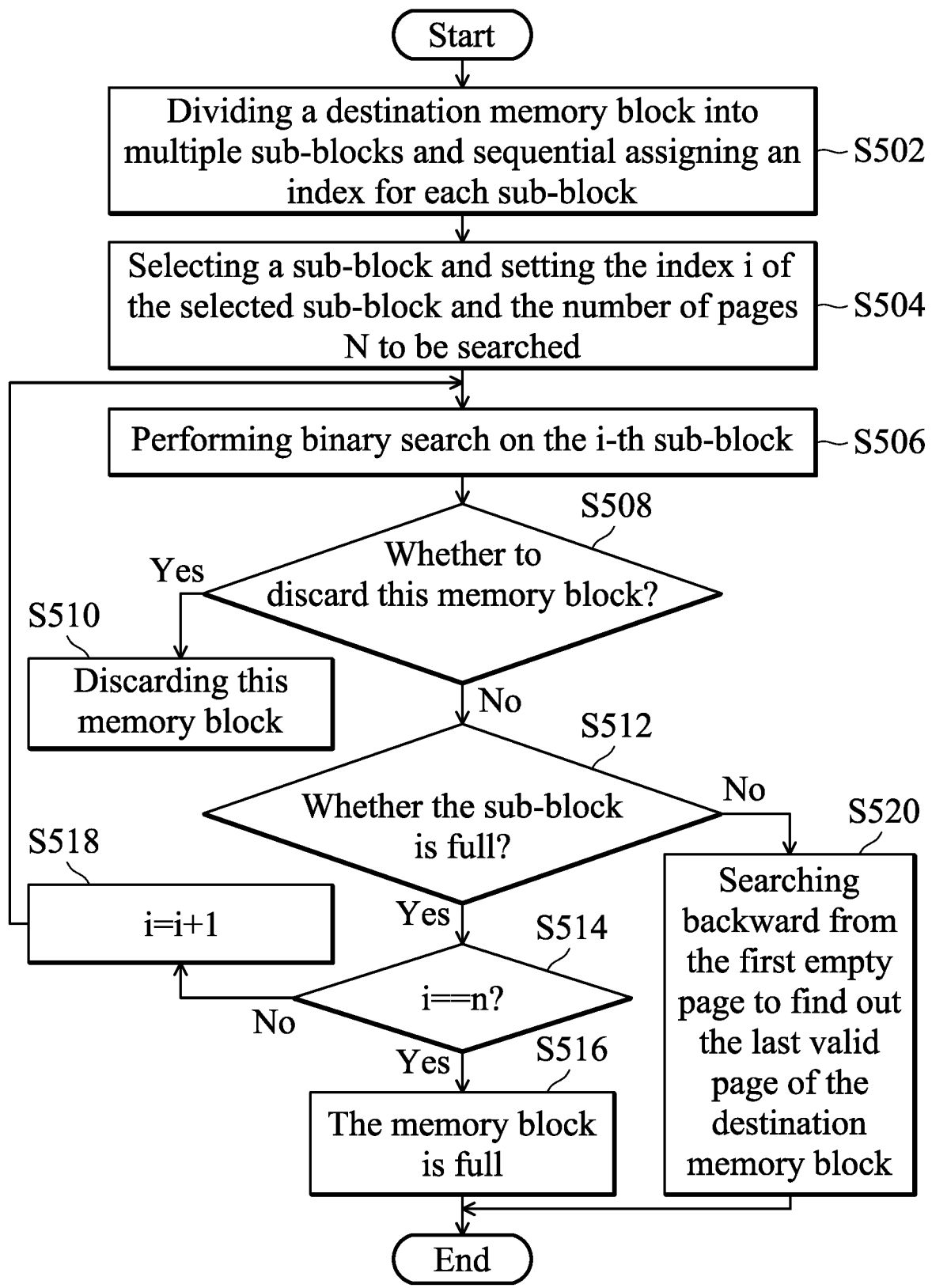
FIG. 5 is a detailed flow chart of the data processing method according to a first embodiment of the invention.

FIG. 5 is a detailed flow chart of the data processing method according to a first embodiment of the invention.

In step S502: the memory controller 110 is configured to divide a destination memory block (for example, the destination memory block 220_1) previously utilized in a garbage collection procedure that has not been finished into n sub-blocks, and sequential assign an index for each sub-block, where n is a positive integer. As discussed above, it is preferable to divide the destination memory block equally into multiple sub-blocks such that each sub-block comprises the same number of pages, but the invention should not be limited thereto.

In step S504: the memory controller 110 is configured to select a sub-block and set the parameters for performing the binary search based on the selected sub-block, where the parameters comprise the index i of the selected sub-block and the number N of pages to be searched. In this embodiment, the memory controller 110 selects the sub-block having the smallest index (that is, the first sub-block) to perform the binary search. Therefore, i=0 and N is the number of pages comprised in the first sub-block, and N is a power of 2 (that is, $N=2^y$, where y is a positive integer).

In step S506: the memory controller 110 is configured to perform binary search on the i-th sub-block.

Figure 6:
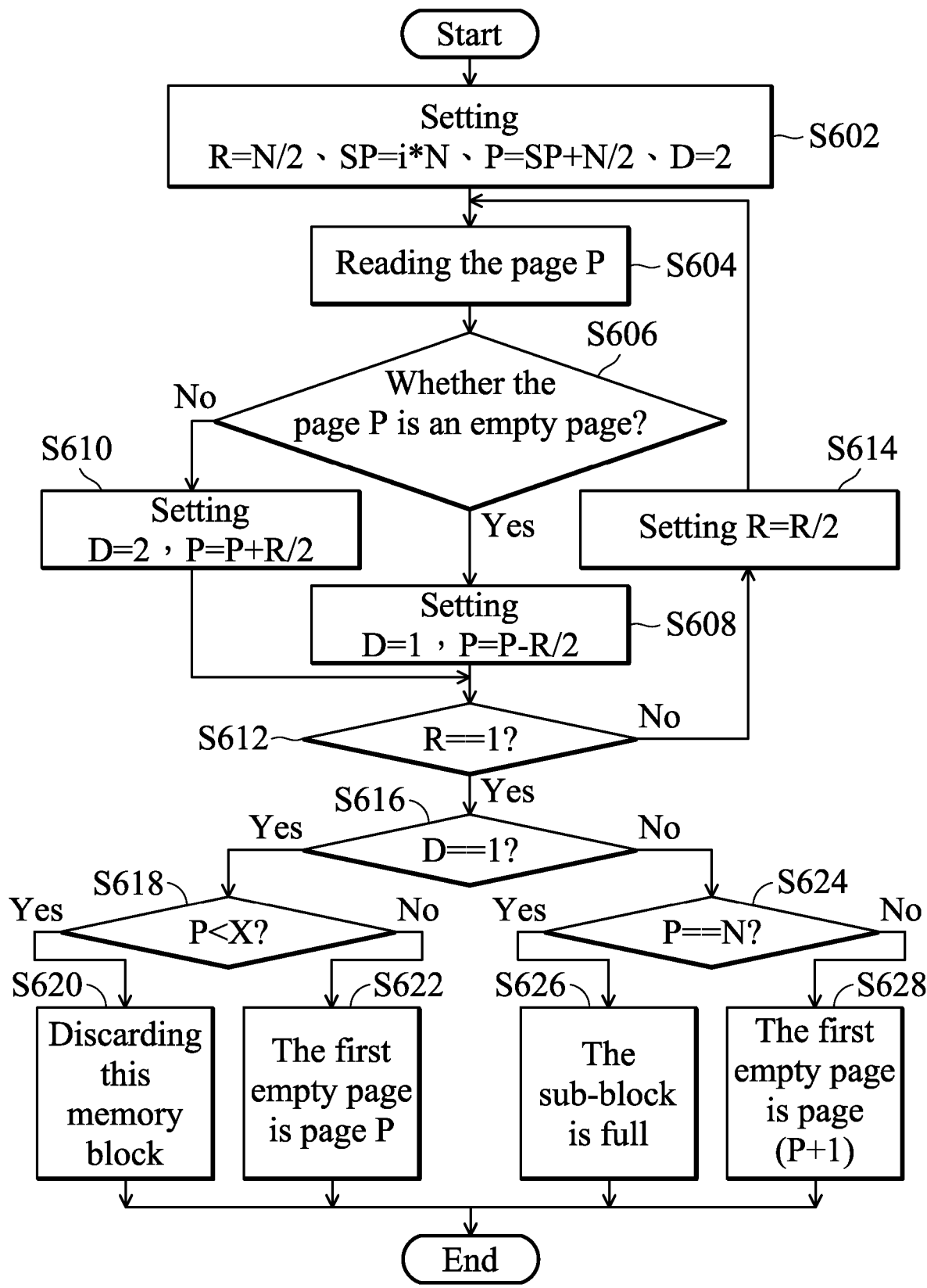
FIG. 6 is a flow chart of the binary search according to the first embodiment of the invention.

FIG. 6 is a flow chart of the binary search according to the first embodiment of the invention.

In step S602: the memory controller 110 is configured to determine the range R of the pages to be searched, the start page SP of the currently selected sub-block, the index P of the page to be searched and the search direction D according to the index i of the selected sub-block and the number N of pages to be searched, wherein the range R of the pages to be searched is set to R=N/2, the start page SP is set to SP=i*N, the index P of the page to be searched is set to P=SP+N/2 and the search direction D is set to D=2, which means that a forward search is to be performed (that is, in the direction where the index of the page is increasing). It should be noted that in the embodiment of the invention, the division of the range R is an integer division, that is, the range R obtained from the division of R=N/2 is a positive integer and is a quotient of N/2.

In step S604: the memory controller 110 is configured to read page P. According to an embodiment of the invention, the memory controller 110 may read the spare region of page P and determine whether page P is an empty page according to the read content. According to another embodiment of the invention, the memory controller 110 may also read the data region of page P and determine whether page P is an empty page according to the read content.

In step S606: the memory controller 110 is configured to determine whether page P is an empty page or not. If so, the flow goes to step S608. If not, the flow goes to step S610.

In step S608: the memory controller 110 is configured to change the search direction and set the index of page P to be searched in the next round in a reverse direction (in a backward manner), where D=1 and P=(P−R/2).

In step S610: the memory controller 110 is configured to maintain the search direction and set the index of page P to be searched in the next round, where D=2 and P=(P+R/2).

In step S612: the memory controller 110 is configured to determine whether the current range R of the page(s) to be searched equals 1. If so, the flow goes to step S616. If not, the flow goes to step S614.

In step S614: the memory controller 110 is configured to reduce the range R of the page(s) to be searched in half by setting R=R/2. Thereafter, the method returns to step S604 to read page P.

In step S616: the memory controller 110 is configured to determine whether the search direction is set to a backward direction (that is, in the direction where the index of the page is decreasing). If so, the flow goes to step S618. If not, the flow goes to step S624.

In step S618: the memory controller 110 is configured to determine whether the index P of page to be searched is smaller than a predetermined threshold value X. If so, the flow goes to step S620. If not, the flow goes to step S622. According to an embodiment of the invention, the threshold value X may be set to a small number, such as X=4, as a basis for determining whether to discard this memory block.

In step S620: the memory controller 110 is configured to discard this memory block. Since the amount of data written in this memory block is few, the memory controller 110 may determine to directly discard content of all valid page(s) that has been written in this memory block and select another destination memory block to restart a garbage collection procedure, so as to move valid data from at least one source memory block to the selected destination memory block.

In step S622: the memory controller 110 determines that the first empty page is page P.

In step S624: the memory controller 110 determines whether the index P of the page to be searched equals the number N of pages to be searched. If so, the flow goes to step S626. If not, the flow goes to step S628.

In step S626, the memory controller 110 determines that the sub-block currently selected is full.

In step S628, the memory controller 110 determines that the first empty page is page (P+1).

As shown in FIG. 6, the result of a binary search may be that the first empty page is successfully found out (that is, the sub-block currently selected is not full), the sub-block currently selected is full or the memory block should be discarded directly.

Referring back to FIG. 5, when the step S506 is performed, the flow goes to step S508.

In step S508, the memory controller 110 is configured to determine whether to discard this memory block according to the result of the binary search. If so, the flow goes to step S510. If not, the flow goes to step S512.

In step S510, the memory controller 110 is configured to perform the related operations for discarding the memory block. For example, the memory controller 110 will no longer use the original destination memory block (for example, the destination memory block 220_1), directly use another memory block (for example, the destination memory block 220_2) as the new destination memory block and restart the data transfer to move the valid data from at least one source memory block to the new destination memory block. Since the links related to the original destination memory block have not been updated as the SPO occurs, there is no need for the memory controller 110 to perform any specific operations to modify or update the links for the original destination memory block, and the data stored in the original destination memory block will directly become invalid after the restarted data transfer is completed.

In step S512, the memory controller 110 is configured to determine whether the currently selected sub-block is full according to the result of the binary search. If so, the flow goes to step S514. If not, the flow goes to step S520.

In step S514, the memory controller 110 is configured to determine whether the index i of the currently selected sub-block equals the total number n of the sub-blocks. If so, the flow goes to step S516. If not, the flow goes to step S518.

In step S516, the memory controller 110 determines that the memory block is full. That is, there is no empty page in the destination memory block (for example, the destination memory block 220_1). The memory controller 110 may directly use another memory block (for example, the destination memory block 220_2) to continue the suspended garbage collection procedure.

In step S518, the memory controller 110 is configured to increase the index of the sub-block, where i=i+1 and the method returns to step S506, so as to perform the binary search on the next sub-block. It should be noted that according to another embodiment of the invention, if the memory controller 110 selects the sub-block having the largest index (that is, the last sub-block) to begin the binary search and set the index i as i=n, in step S518, the memory controller 110 is configured to decrease the index of the sub-block, that is, i=i−1. In addition, in step S514, the memory controller 110 is configured to determine whether the index i of the currently selected sub-block equals 0.

In step S520: since the currently selected sub-block is not full, the memory controller 110 may start to search backward from the first empty page to find the last valid page of the destination memory block.

Figure 7:
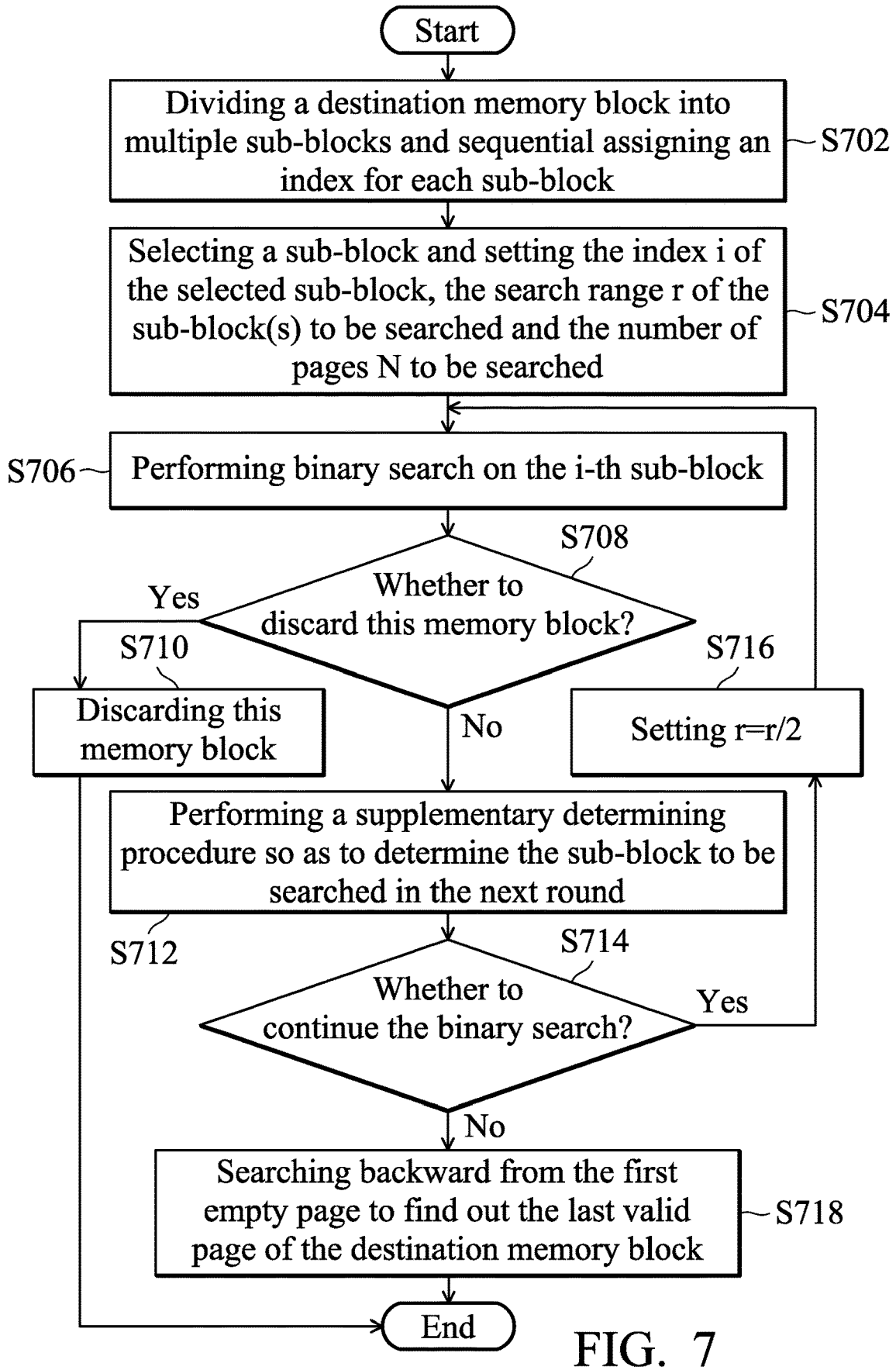
FIG. 7 is a detailed flow chart of the data processing method according to a second embodiment of the invention.

FIG. 7 is a detailed flow chart of the data processing method according to a second embodiment of the invention. In the second embodiment, the memory controller 110 may perform the binary search from the sub-block having an index that is closest to a median of the indices.

In step S702: the memory controller 110 is configured to divide a destination memory block (for example, the destination memory block 220_1) previously utilized in a garbage collection procedure that has not been finished into n sub-blocks, and sequential assign an index for each sub-block, where n is a positive integer. As discussed above, it is preferable to divide the destination memory block equally into multiple sub-blocks such that each sub-block comprises the same number of pages, but the invention should not be limited thereto.

In step S704: the memory controller 110 is configured to select a sub-block and set the parameters for performing the binary search based on the selected sub-block, where the parameters comprise the index i of the selected sub-block, the range r of the sub-block(s) to be searched and the number N of pages to be searched. In this embodiment, the memory controller 110 selects the sub-block having the index that is closest to a median of the indices (which form an incremental sequence). Therefore, i=N/2, r=N/2 and N is the number of pages comprised in the selected sub-block, and N is a power of 2 (that is, $N=2^y$, where y is a positive integer).

In step S706: the memory controller 110 is configured to perform binary search on the i-th sub-block.

Figure 8A:
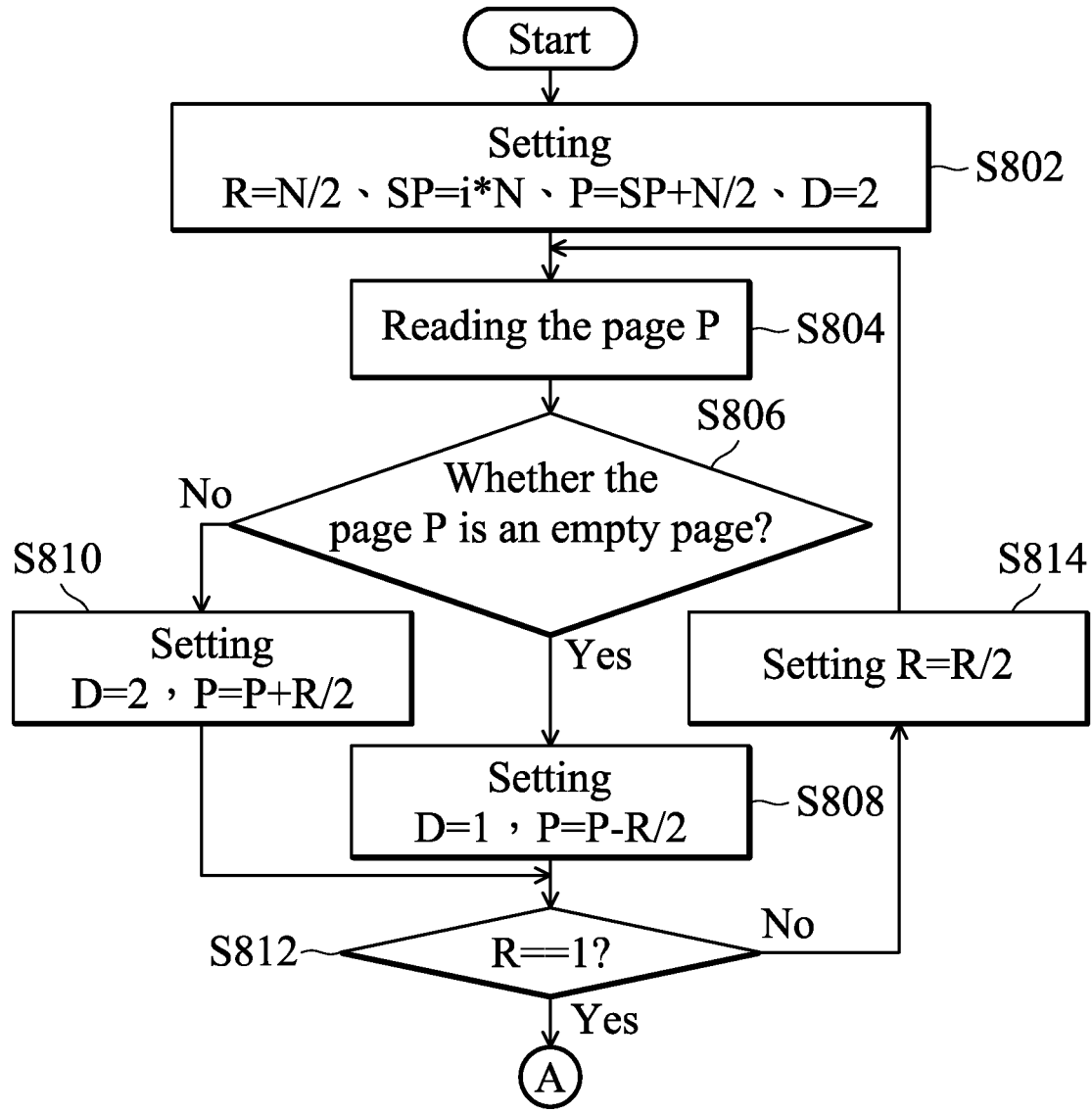
FIG. 8A and FIG. 8B show the flow chart of the binary search according to the second embodiment of the invention.
Figure 8B:
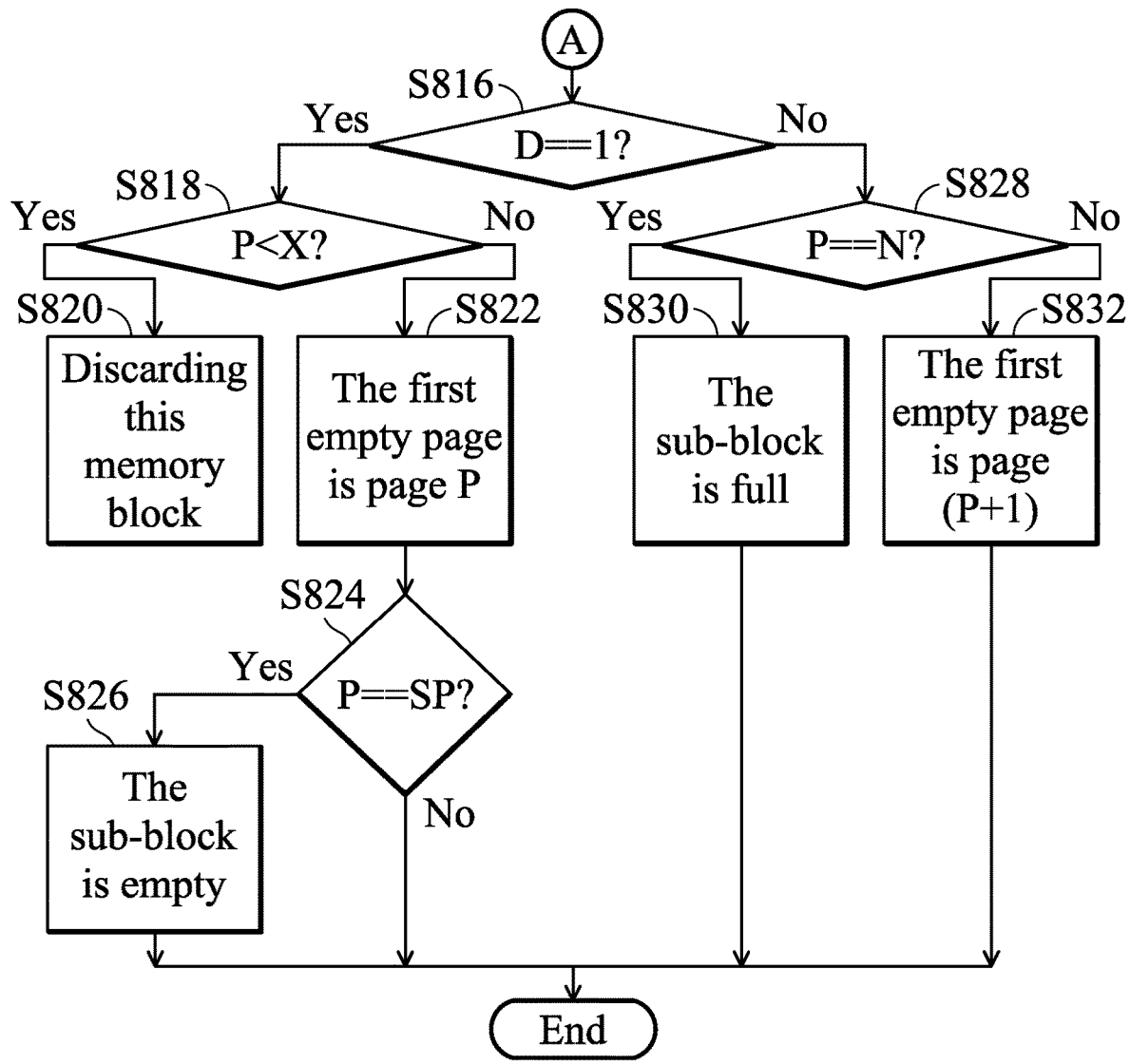

FIG. 8A and FIG. 8B show the flow chart of the binary search according to the second embodiment of the invention.

In step S802: the memory controller 110 is configured to determine the range R of the page(s) to be searched, the start page SP of the currently selected sub-block, the index P of the page to be searched and the search direction D according to the index i of the selected sub-block and the number N of pages to be searched, wherein the range R of the page(s) to be searched is set to R=N/2, the start page SP is set to SP=i*N, the index P of the page to be searched is set to P=SP+N/2 and the search direction D is set to D=2, which means that a forward search is to be performed (that is, in the direction where the index of the page is increasing). It should be noted that in the embodiment of the invention, the division of the range R is an integer division, that is, the range R obtained from the division of R=N/2 is a positive integer and is a quotient of N/2.

In step S804: the memory controller 110 is configured to read page P. According to an embodiment of the invention, the memory controller 110 may read the spare region of page P and determine whether page P is an empty page according to the read content. According to another embodiment of the invention, the memory controller 110 may also read the data region of page P and determine whether page P is an empty page according to the read content.

In step S806: the memory controller 110 is configured to determine whether page P is an empty page or not. If so, the flow goes to step S808. If not, the flow goes to step S810.

In step S808: the memory controller 110 is configured to change the search direction and set the index of page P to be searched in the next round in a reverse direction (in a backward manner), where D=1 and P=(P−R/2).

In step S810: the memory controller 110 is configured to maintain the search direction and set the index of page P to be searched in the next round, where D=2 and P=(P+R/2).

In step S812: the memory controller 110 is configured to determine whether the current range R of the page(s) to be searched equals 1. If so, the flow goes to step S816. If not, the flow goes to step S814.

In step S814: the memory controller 110 is configured to reduce the range R of the page(s) to be searched in half by setting R=R/2. Thereafter, the method returns to step S804 to read page P.

In step S816: the memory controller 110 is configured to determine whether the search direction is set to a backward direction (that is, in the direction where the index of the page is decreasing). If so, the flow goes to step S818. If not, the flow goes to step S828.

In step S818: the memory controller 110 is configured to determine whether the index P of page to be searched is smaller than a predetermined threshold value X. If so, the flow goes to step S820. If not, the flow goes to step S822. According to an embodiment of the invention, the threshold value X may be set to a small number, such as X=4, as a basis for determining whether to discard this memory block.

In step S820: the memory controller 110 is configured to discard this memory block. Since the amount of data written in this memory block is few, the memory controller 110 may determine to directly discard content of all valid pages that has been written in this memory block and select another destination memory block to restart a garbage collection procedure, so as to move valid data from at least one source memory block to the selected destination memory block.

In step S822: the memory controller 110 determines that the first empty page is page P.

In step S824: the memory controller 110 determines whether the first empty page P is the start page SP. If so, the flow goes to step S826. If not, the flow ends.

In step S826, the memory controller 110 determines that the sub-block currently selected is empty.

In step S828, the memory controller 110 determines whether the index P of the page to be searched equals the total number N of pages to be searched. If so, the flow goes to step S830. If not, the flow goes to step S832.

In step S830, the memory controller 110 determines that the sub-block currently selected is full.

In step S832, the memory controller 110 determines that the first empty page is page (P+1).

As shown in FIG. 8, the result of a binary search may be that the first empty page is successfully found out (that is, the sub-block currently selected is not full and is also not empty), the sub-block currently selected is full, the sub-block currently selected is empty or the memory block should be discarded directly.

Referring back to FIG. 7, when the step S706 is performed, the memory controller 110 is configured to determine whether to stop the binary search or to continue the binary search from a sub-block having an index that is smaller or greater according to the search result.

In step S708, the memory controller 110 is configured to determine whether to discard this memory block according to the result of the binary search. If so, the flow goes to step S710. If not, the flow goes to step S712.

In step S710, the memory controller 110 is configured to perform the related operations for discarding the memory block. For example, the memory controller 110 will no longer use the original destination memory block (for example, the destination memory block 220_1), directly use another memory block (for example, the destination memory block 220_2) as the new destination memory block and restart the data transfer to move the valid data from at least one source memory block to the new destination memory block. Since the links related to the original destination memory block have not been updated as the SPO occurs, there is no need for the memory controller 110 to perform any specific operations to modify or update the links for the original destination memory block, and the data stored in the original destination memory block will directly become invalid after the restarted data transfer is completed.

In step S712, the memory controller 110 is configured to perform a supplementary determining procedure so as to determine the sub-block to be searched in the next round.

Figure 9:
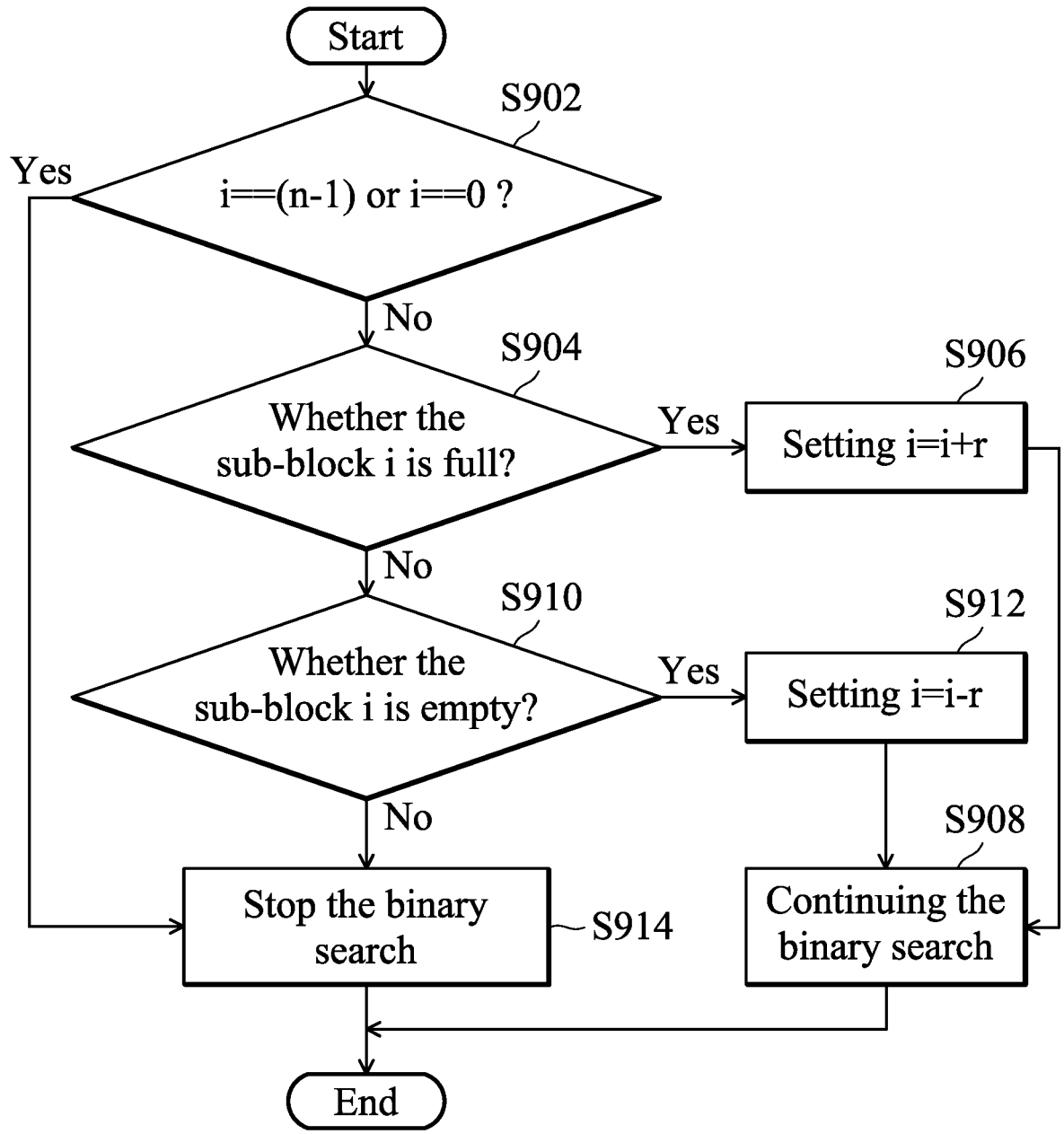
FIG. 9 is a flow chart of the supplementary determining procedure according to the second embodiment of the invention.

FIG. 9 is a flow chart of the supplementary determining procedure according to the second embodiment of the invention.

In step S902: the memory controller 110 is configured to determine whether the index i of the currently selected sub-block is equal to (n−1) or equal to 0. If the index i is equal to (n−1) or equal to 0, the flow goes to step S914. If not, the flow goes to step S904.

In step S904: the memory controller 110 is configured to determine whether the currently selected sub-block is full. If so, the flow goes to step S906. If not, the flow goes to step S910.

In step S906: the memory controller 110 determines to select the next sub-block having a larger index, that is, to set i=i+r.

In step S908: the memory controller 110 determines to continue the binary search.

In step S910: the memory controller 110 determines whether the currently selected sub-block is empty (that is, all the pages comprised in the currently selected sub-block are empty pages). If so, the flow goes to step S912. If not, the flow goes to step S914.

In step S912: the memory controller 110 determines to select the next sub-block having a smaller index, that is, to set i=i−r.

In step S914: the memory controller 110 determines to stop the binary search.

Referring back to FIG. 7, after the step S712, the step S714 is performed.

In step S714: the memory controller 110 is configured to determine whether the result obtained in step S712 is to continue the binary search or not. If so, the flow goes to step S716. If not, the flow goes to step S718.

In step S716: the memory controller 110 is configured to reduce the ranger of the sub-block(s) to be searched in half by setting r=r/2. Thereafter, the method returns to step S706 to perform binary search on the i-th sub-block.

In step S718: the memory controller 110 is configured to stop the binary search and start to search backward from the first empty page to find the last valid page of the destination memory block.

As discussed above, according to the embodiments of the invention, when an SPO has occurred to the data storage device 100 and there is an unfinished garbage collection procedure, the memory controller 110 can find the first empty page of the destination memory block rapidly and accurately by performing a binary search. Thereafter, the memory controller 110 can search backward from the first empty page to find the last valid page of the destination memory block, so as to obtain information regarding the last valid page of the destination memory block and re-perform the garbage collection procedure based on the information regarding the last valid page of the destination memory block. Compared to conventional designs in which a great number of pages have to be searched in order to find the last valid page of the destination memory block, the proposed data processing method is much more efficient and the data processing speed is faster.

In addition, the proposed data processing method is also applicable to the memory device in which a total number of pages of a memory block is not a power of 2. That is, in a case when the above-mentioned first predetermined number is not a power of 2. For example, when the destination memory block is a TLC memory block, the total number of logical pages of a memory block may be $3*2^y$. Generally, in this case, when the binary search is performed on the memory block, the binary search may fail. However, according to the embodiments of the invention, when the proposed data processing method is applied, the destination memory block can be divided into three sub-blocks, thereby the pages comprised in each sub-block can be a power of 2. In this manner, the binary search can be successfully performed on one or more sub-blocks, and the first empty page and the last valid page of the destination memory block can be rapidly and accurately found out. In this manner, the garbage collection procedure can be re-performed based on the information regarding the first empty page and the last valid page of the destination memory block.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data storage device, comprising:
    a memory device, comprising a plurality of memory blocks, each memory block comprising a first predetermined number of pages; and
    a memory controller, coupled to the memory device and configured to access the memory device,
    wherein in a sudden power off recovery (SPOR) procedure, the memory controller is configured to divide a destination memory block previously utilized in a garbage collection procedure that has not been finished into multiple sub-blocks, sequentially perform a binary search on one or more sub-blocks to determine a first empty page of the destination memory block, sequentially read one or more pages from the first empty page to determine a last valid page of the destination memory block and re-perform the garbage collection procedure according to the last valid page, and
    wherein each sub-block comprises a second predetermined number of pages, the second predetermined number is smaller than the first predetermined number, and the second predetermined number is a power of 2.

2. The data storage device as claimed in claim 1, wherein the memory controller is configured to determine whether a page being searched is an empty page according to content recorded in a spare region of the page.

3. The data storage device as claimed in claim 1, wherein the memory controller is configured to sequentially assign an index to each sub-block, the indices assigned to the sub-blocks form an incremental sequence, and the memory controller is configured to perform the binary search from the sub-block having a smallest index.

4. The data storage device as claimed in claim 1, wherein the memory controller is configured to resume the garbage collection procedure that has not been finished according to a source memory block and page information recorded in the last valid page.

5. The data storage device as claimed in claim 1, wherein when an index of the last valid page is smaller than a threshold value, the memory controller is configured to discard content of all valid page(s) of the destination memory block and select another destination memory block to restart a garbage collection procedure, so as to move valid data from at least one source memory block to the other destination memory block.

6. The data storage device as claimed in claim 1, wherein when the memory controller determines the last valid page of the destination memory block, the memory controller is configured to keep reading the page(s) backward from the first empty page, until the memory controller finds a page whose quality satisfies a criterion, and wherein the first page that the memory controller finds to have quality that satisfies the criterion is determined as the last valid page.

7. The data storage device as claimed in claim 1, wherein the memory controller is configured to sequentially assign an index to each sub-block, the indices assigned to the sub-blocks form an incremental sequence, and the memory controller is configured to perform the binary search from the sub-block having an index that is closest to a median of the incremental sequence.

8. The data storage device as claimed in claim 7, wherein the memory controller is configured to determine whether to stop the binary search, or to continue the binary search from a sub-block having an index that is smaller or greater than the index that is closest to the median according to a search result of the sub-block having the index that is closest to the median of the incremental sequence.

9. A data processing method for a data storage device, wherein the data storage device comprises a memory device and a memory controller, the memory device comprises a plurality of memory blocks, each memory block comprises a first predetermined number of pages, the memory controller is coupled to the memory device and configured to access the memory device, and the method comprises:

dividing a destination memory block previously utilized in a garbage collection procedure that has not been finished into multiple sub-blocks in a sudden power off recovery (SPOR) procedure of the memory device, wherein each sub-block comprises a second predetermined number of pages, the second predetermined number is smaller than the first predetermined number, and the second predetermined number is a power of 2;

sequentially performing a binary search on one or more sub-blocks to determine a first empty page of the destination memory block;

sequentially reading one or more pages from the first empty page to determine a last valid page of the destination memory block; and re-performing the garbage collection procedure according to the last valid page.

10. The data processing method as claimed in claim 9, wherein the step of sequentially performing a binary search on one or more sub-blocks to determine a first empty page of the destination memory block further comprises:

determining whether the page being searched is an empty page according to content recorded in a spare region of the page.

11. The data processing method as claimed in claim 9, wherein the step of sequentially performing a binary search on one or more sub-blocks to determine a first empty page of the destination memory block further comprises:

sequentially assigning an index to each sub-block, wherein the indices assigned to the sub-blocks form an incremental sequence; and performing the binary search from the sub-block having a smallest index.

12. The data processing method as claimed in claim 9, wherein the step of re-performing the garbage collection procedure according to the last valid page further comprises:

resuming the garbage collection procedure that has not been finished according to a source memory block and page information recorded in the last valid page.

13. The data processing method as claimed in claim 9, wherein the step of re-performing the garbage collection procedure according to the last valid page further comprises:

determining whether an index of the last valid page is smaller than a threshold value; and when the index of the last valid page is smaller than the threshold value, discarding content of all valid page(s) of the destination memory block and selecting another destination memory block to restart a garbage collection procedure, so as to move valid data from at least one source memory block to the other destination memory block.

14. The data processing method as claimed in claim 9, wherein the step of sequentially performing a binary search on one or more sub-blocks to determine a first empty page of the destination memory block further comprises:

sequentially assigning an index to each sub-block, wherein the indices assigned to the sub-blocks form an incremental sequence; and performing the binary search from the sub-block having an index that is closest to a median of the incremental sequence.

15. The data processing method as claimed in claim 14, wherein the step of sequentially performing a binary search on one or more sub-blocks to determine a first empty page of the destination memory block further comprises:

determining whether to stop the binary search, or to continue the binary search from a sub-block having an index that is smaller or greater than the index that is closest to the median according to a search result of the sub-block having the index that is closest to the median of the incremental sequence.

* * * * *